Dec. 25, 1962
C. ROE
3,070,383
SNOW RUNNERS FOR VEHICLE WHEELS
Filed Nov. 2, 1961
2 Sheets-Sheet 1
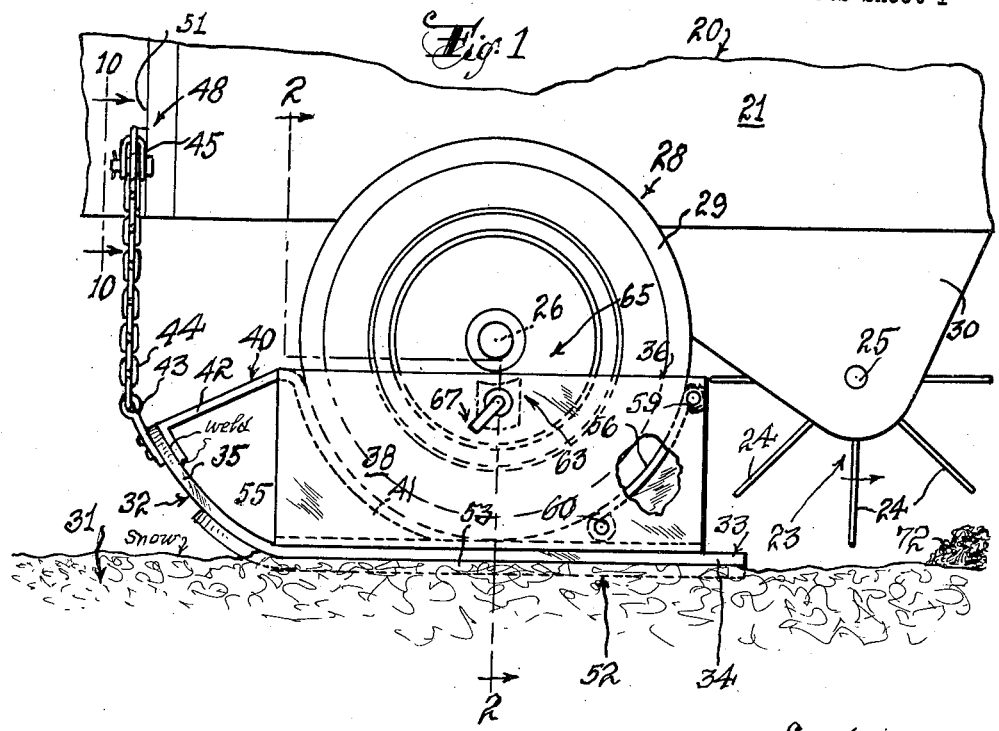
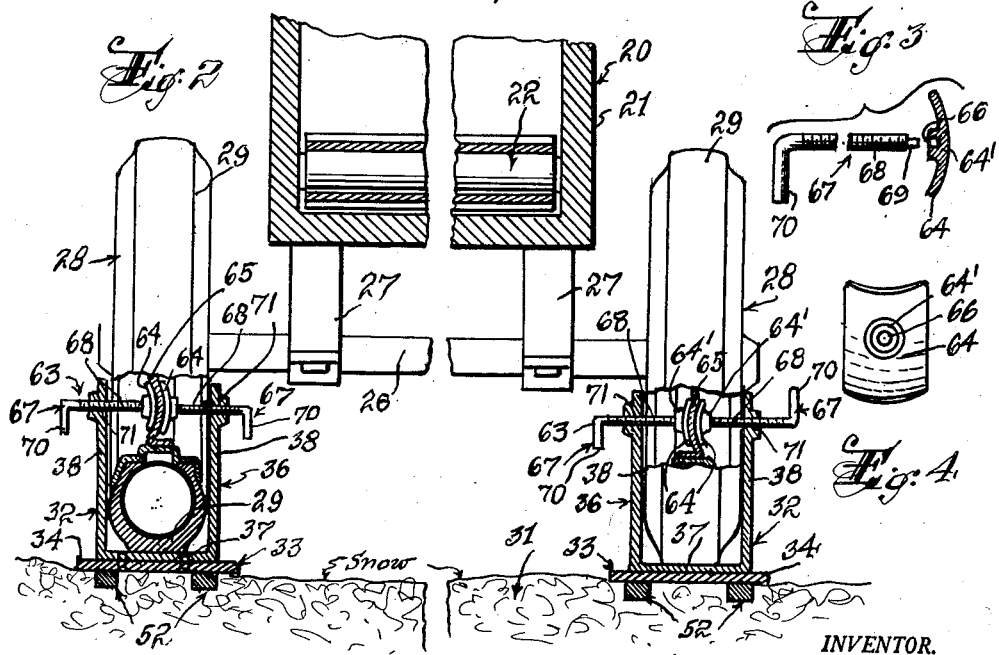
INVENTOR.
Chriss Roe,
BY Victor J. Evans & Co.
ATTORNEYS Dec. 25, 1962 C. ROE 3,070,383
SNOW RUNNERS FOR VEHICLE WHEELS
Filed Nov. 2, 1961 2 Sheets-Sheet 2
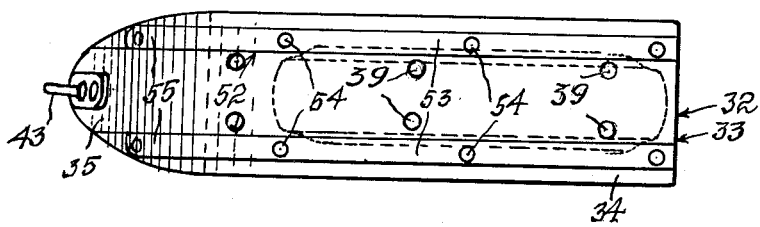
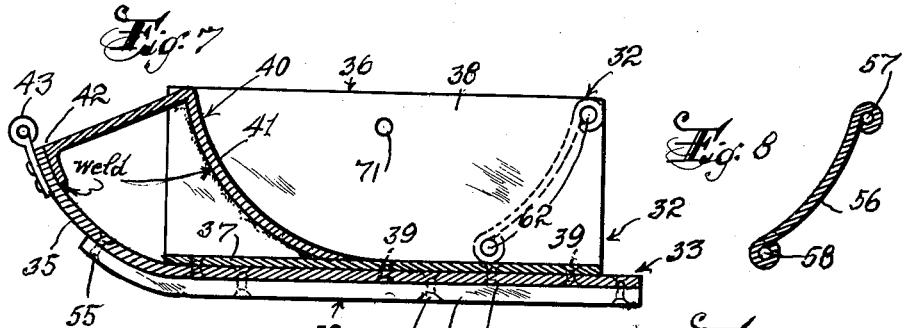
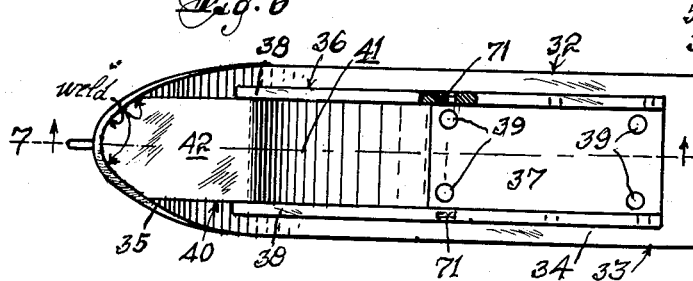
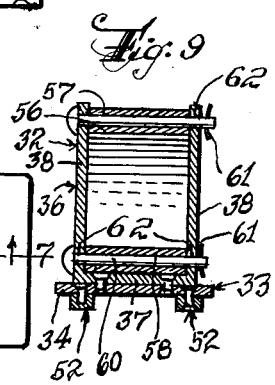
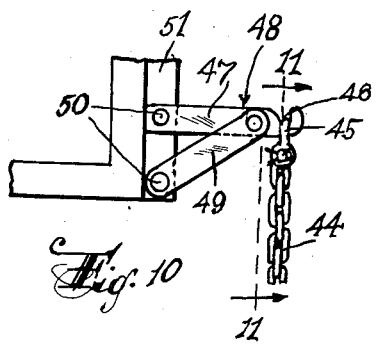
INVENTOR.
Chriss Roe,
BY
Victor J. Evans & Co.
ATTORNEYS

United States Patent Office 3,070,383
Patented Dec. 25, 1962

3,070,383
SNOW RUNNERS FOR VEHICLE WHEELS
Chriss Roe, Charlotteville, N.Y.
Filed Nov. 2, 1961, Ser. No. 149,622
3 Claims. (Cl. 280—13)

This invention relates to a wheeled vehicle, and more particularly to runners for the wheels of such a vehicle, and wherein the runners of the present invention are adapted to be used for facilitating the use of the vehicle on snow.

The primary object of this invention is to provide runners for the wheels of a vehicle such as a manure spreader, wherein such a vehicle can be conveniently used when there is snow on the ground since the runners of the present invention will help prevent the wheels from sinking in the deep snow or the like.

A further object is to provide wheel runners of the type stated that can be readily attached to or detached from the wheels of a manure spreader or the like, and wherein the runners include a novel clamping means for maintaining the runners properly connected to the wheels when the runners are being used.

Still another object is to provide a wheel runner that is economical to manufacture and efficient in operation and which is rugged in structure, and foolproof in use.

These and other objects of the invention will become apparent from a reading of the following specification and claims, together with the accompanying drawings, wherein like parts are referred to and indicated by like reference characters and wherein:

FIGURE 1 is a fragmentary side elevational view of a wheeled vehicle such as a manure spreader, and showing the snow runner of the present invention attached to a wheel.

FIGURE 2 is a sectional view taken on the line 2—2 of FIGURE 1.

FIGURE 3 is a detailed sectional view, with parts broken away illustrating a part of the clamp.

FIGURE 4 is an elevational view illustrating a plate member which forms part of the clamp.

FIGURE 5 is a bottom plan view of a wheel snow runner.

FIGURE 6 is a top plan view, with the back plate removed.

FIGURE 7 is a sectional view taken on the line 7—7 of FIGURE 6.

FIGURE 8 is a sectional view taken through the removable back plate.

FIGURE 9 is a sectional view through the rear portion of the runner, showing how the removable back plate is fastened therein.

FIGURE 10 is a fragmentary elevational view showing the bracket for holding the chain.

FIGURE 11 is a sectional view taken on the line 11—11 of FIGURE 10.

Referring in detail to the drawings, the numeral 20 indicates a portion of a wheeled vehicle which may be a manure spreader, and as shown in the drawings, the manure spreader 20 is adapted to have a conventional construction and includes a body portion or body member 21 which is adapted to have a conveyor 22 therein whereby the manure can be moved through the member 21 in the desired manner, and the numeral 23 indicates a spreader unit which may include rotary tines or blades 24 as well as a shaft or axle 25 that is adapted to be supported as at 30 on the manure spreader.

As shown in FIGURE 2, an axle 26 is adapted to be connected to the body member 21 as at 27, and the axle 26 has conventional wheels 28 connected thereto, and these wheels 28 may include pneumatic tires 29. The numeral 31 indicates snow.

According to the present invention there are provided snow runners which are indicated generally by the numeral 32, and one of the runners 32 is provided for each wheel 28, and as shown in the drawings each runner 32 includes a base 33 which is shaped to include a main straight portion 34 as well as a forwardly arranged upwardly curved portion 35. The numeral 36 indicates a generally U-shaped support member which includes a horizontally disposed bottom wall 37 that is secured as at 39 to the portion 34 of the base 33. The support member 36 further includes a pair of vertically disposed spaced parallel side walls 38.

As shown in the drawings, there is provided a front plate which is indicated generally by the numeral 40, and the front plate 40 includes a curved section 41 which is secured between the side walls 38 as by welding, and formed integral with the curved section 41 or secured thereto is an inclined brace, and the brace 42 has its front end secured as by welding to the upwardly curved front portion 35 of the base 33, FIGURE 7.

The numeral 43 indicates an eye member or fastener which is suitably affixed to the upper front portion of the base 33, and a chain 44 has its lower end connected to the eye member 43, there being a yoke or retainer 45 on the upper end of the chain 44, and the yoke 45 is adapted to engage a slot or groove 46 in an arm 47 which forms part of a bracket 48, and the bracket or hanger 48 includes an inclined brace 49, FIGURE 10, the bracket 48 being secured as at 50 to a supporting element 51 on the body member 21.

There is further provided a pair of spaced apart similar bars 52 which are mounted below the base 33, and the bars 52 include straight sections 53 which are arranged below the straight portion 34 of the base 33, and the bars 52 are secured to the base 33 in any suitable manner, as for example by means of securing elements 54, and as shown in FIGURE 7, the bars 52 include forwardly disposed upwardly curved sections 55 which are arranged contiguous to the lower surface of the curved portion 35.

As shown in FIGURE 8 there is provided a removable back plate which is indicated by the numeral 56, and the back plate 56 includes on its ends apertured portions or eyes 57 and 58, and bolts or securing elements 59 and 60 are adapted to extend through these eye portions 57 and 58, and these bolts 59 and 60 are adapted to be held in place by cotter pins 61. The numeral 62 indicates apertures or openings in the side walls 38 for the projection therethrough of the bolts 59 and 60.

The wheel runner of the present invention further includes a releasable manually operable clamping means which is indicated generally by the numeral 63, and the clamping means 63 includes a pair of arcuate plate members or jaws 64 which are adapted to be arranged on opposite sides of the portions 65 of the wheel 28, and the plate members 64 are provided with integral shoulders 64' which have recesses or sockets 66 therein. The clamping means 63 also includes a pair of similar manually operable screw members 67 which each include a threaded shank 68 as well as a reduced diameter end portion 69, and the end portion 69 is adapted to engage the recesses 66, and each screw member 67 further includes a handle or hand gripping portion 70. Threaded apertures or openings 71 are arranged in the side walls 38 for threaded engagement with the threaded shank 68 of the screw member 67.

From the foregoing, it is apparent that there has been provided runners which are especially suitable for use on wheels of vehicles whereby such vehicles can be used on snow, and in use with the parts arranged as shown in the drawings, it will be seen that one of the runners 32 is adapted to be used on each wheel such as each wheel 28. The wheels 28 may be part of a conventional piece of equipment such as a manure spreader 20, and by utilizing the runners 32 of the present invention, such a manure spreader can be used even when there is snow such as snow 31 on the ground. Thus, manure can be discharged by the spreader unit 23 onto the snow so that for example it is not necessary to wait for the snow to melt to spread the manure. By spreading the manure on the snow, the manure will have a tendency to be soaked down into the ground when the snow melts so as to help insure that the manure will be carried into the soil in the most advantageous manner.

Each of the runners 32 has the same construction, and the runners 32 are constructed so that they can be readily connected to or detached from the wheels 28. Thus, when there is no snow on the ground, the runners 32 can be readily removed or disconnected from the wheels so as to permit the manure spreader to be used in the usual manner. However, when there is snow on the ground, the runners 32 are adapted to be connected to the wheels as shown in the drawings, and it is to be noted that each of the runners 32 includes the pair of lower bars or shoes 52 which are spaced apart relative to each other, and these bars 52 help prevent the runners from skidding or slipping on the snow in a sidewise direction. The bars 52 are fixedly secured to the base 33, and the support member 36 is secured fixedly to the base 33, and the support member 36 has the portion 41 of the front plate 40 secured thereto. The portion 41 is of arcuate formation so that it will snugly engage or receive therein an outer peripheral portion of a wheel, and after a wheel has been received in the support member 36, the back plate 56 can be arranged in place as shown in the drawings, and then the bolts such as the bolts 59 and 60 can be inserted through the registering openings 62 and 57 and 58 and then the cotter pin 61 can be used for maintaining these parts in their proper assembled position. The clamping means 63 is provided for helping to prevent the runner 32 from separating from the wheel 28, and it is to be noted that the clamping means 63 includes the pair of arcuate plate members 64 which are adapted to engage opposite surfaces of the portion 65 of a wheel 28, and the screw members 67 have their threaded shanks 68 arranged in threaded engagement with the aperture 71 in the side walls 38, so that by manually gripping the handle 70 and properly rotating or turning the screw members 67, and with the reduced diameter end portion 69 in engagement with the recesses 66 of the shoulders 64', it will be seen that the jaws or plate members 64 can be tightened or clamped against the wheel portion 65 in order to fixedly clamp the runner onto the wheel.

The chain 44 is connected as at 43 to the front of the base 33, and the yoke 45 on the upper end of the chain 44 is adapted to engage the groove 46 in the arm 47 of the hanger 48, and the hanger 48 is fixedly secured as at 50 to the portion 51 of the manure spreader 20.

The spreader unit 23 is of conventional construction and may be of the type which is suitably actuated or rotated so as to spread the manure received from the conveyor 22, whereby the manure can be spread onto the snow 31, and this manure is indicated in FIGURE 1 by the numeral 72.

The parts can be made of any suitable material and in different shapes or sizes.

The snow shoes or runners of the present invention are adapted to be used on manure spreaders so that manure and the like can be more efficiently and effectively spread even when the manure spreader is being used in deep snow, and the runners of the present invention fit over the regular manure spreader tires and wheels and prevent the tires from cutting into deep snow. The bars or shoes 52 serve to prevent sliding on hills or the like, and the manure spreader can be pulled or moved by any suitable power mechanism. The back plate 56 is adapted to be removed by disconnecting or removing the bolts 59 and 60. When the wheel is being mounted in the snow shoe, the clamp 63 is loosened or removed, and after the wheel is properly positioned in the shoe, the clamp 63 is tightened, and after tightening the clamp, the chain 44 is adapted to be connected in place as shown in FIGURE 1, so that the snow shoe is ready for use. Each wheel is adapted to be equipped or provided with a snow shoe, and the snow shoe attachment of the present invention is adapted to be used with various makes of power take-off manure spreaders.

Although the invention herein described is fully capable of achieving the objects and providing the advantages hereinbefore mentioned, it is to be understood that it is merely illustrative of the presently preferred embodiment of the invention, and that the invention is not to be limited to the details of construction herein described other than as defined in the appended claims.

What is claimed is:

1. For attachement to a wheel of a vehicle, a runner comprising a base including a main straight portion and a forwardly arranged upwardly curved portion, a U-shaped support member including a bottom wall arranged contiguous to the upper surface of the main straight portion and secured thereto, said support member further including a pair of spaced parallel vertically disposed side walls, a front plate including a curved section secured between said side walls, an inclined brace extending between said curved section and the upwardly curved front portion of said base and secured thereto; an eye member affixed to the upper front portion of said base, a chain having its lower end connected to said eye member, a bracket connected to the vehicle and said bracket including an arm having a slot therein, a yoke on the upper end of said chain and engaging said slot, a pair of spaced apart bars mounted below said base and said bars including straight sections secured below the straight portions of said base, said bars further including forwardly disposed upwardly curved sections arranged contiguous to the lower surface of the curved portion of the base; a back plate arranged between said side walls, and said back plate having apertured end portions, securing elements extending through said apertured end portions and through said side walls, and manually operable clamping means operatively connected to said side walls.

2. For attachment to a wheel of a vehicle, a runner comprising a base including a main straight portion and a forwardly arranged upwardly curved portion, a U-shaped support member including a bottom wall arranged contiguous to the upper surface of the main straight portion and secured thereto, said support member further including a pair of spaced parallel vertically disposed side walls, a front plate including a curved section secured between said side walls, an inclined brace extending between said curved section and the upwardly curved front portion of said base and secured thereto; an eye member affixed to the upper front portion of said base, a chain having its lower end connected to said eye member, a bracket connected to the vehicle and said bracket including an arm having a slot therein, a yoke on the upper end of said chain and engaging said slot, a pair of spaced apart bars mounted below said base and said bars including straight sections secured below the straight portions of said base, said bars further including forwardly disposed upwardly curved sections arranged contiguous to the lower surface of the curved portion of the base; a back plate arranged between said side walls, and said back plate having apertured end portions, securing elements extending through said apertured end portions and through said side walls, and manually operable clamping means operatively connected to said side walls, said clamping means comprising a pair of arcuate plate members for engaging opposite sides of the wheel, there being shoulders on said plate members and said shoulders having recesses therein, screw members having reduced diameter end portions engaging said recesses, and said screw members further including threaded shanks and handles, said side walls having threaded openings therein for threadedly engaging the threaded shanks of the screw members.

3. In a wheel runner, a base embodying a main straight portion and a forwardly arranged upwardly curved portion, a U-shaped support member including a bottom wall arranged contiguous to the upper surface of the main straight portion and secured thereto, said support member further including a pair of spaced parallel vertically disposed side walls, a front plate including a curved section secured between said side walls, an inclined brace extending between said curved section and the upwardly curved front portion of said base and secured thereto; an eye member affixed to the upper front portion of said base, a chain having its lower end connected to said eye member, a pair of spaced apart bars mounted below said base and said bars including straight sections secured below the straight portion of said base, said bars further including forwardly disposed upwardly curved sections arranged contiguous to the lower surface of the curved portion of the base, a back plate arranged between said side walls, and said back plate having apertured end portions, securing elements extending through said apertured end portions and through said side walls, clamping means comprising a pair of arcuate plate members having shoulders provided with recesses therein, screw members having reduced diameter end portions engaging said recesses and said screw members further including threaded shanks and handles, said side walls having threaded openings therein for threaded engagement by the threaded shanks.

References Cited in the file of this patent

UNITED STATES PATENTS

| | | |
|---|---|---|
| 275,945 | Roberts | Apr. 17, 1883 |
| 767,907 | Meyer | Aug. 16, 1904 |
| 1,214,685 | Kausch | Feb. 6, 1917 |
| 1,363,148 | Morse | Dec. 21, 1920 |
| 1,810,042 | Gerth | June 16, 1931 |
| 2,523,950 | Golubics | Sept. 26, 1950 |
| 2,530,240 | Graham | Nov. 14, 1950 |
| 2,932,525 | Perry | Apr. 12, 1960 |